United States Patent
Ben-Haim (10) Patent No.: US 9,910,979 B2
(45) Date of Patent: Mar. 6, 2018

(54) INTERCEPTING INTER-PROCESS COMMUNICATIONS

(71) Applicant: International Business Machines Corporation, Armonk, NY (US)

(72) Inventor: Eldan Ben-Haim, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/313,135

(22) Filed: Jun. 24, 2014

(65) Prior Publication Data

US 2015/0371035 A1    Dec. 24, 2015

(51) Int. Cl.
| | | |
|---|---|---|
| G06F 21/50 | (2013.01) | |
| G06F 9/455 | (2006.01) | |
| G06F 9/54 | (2006.01) | |

(52) U.S. Cl.
CPC .......... *G06F 21/50* (2013.01); *G06F 9/45558* (2013.01); *G06F 9/54* (2013.01); *G06F 2009/45595* (2013.01); *G06F 2221/034* (2013.01)

(58) Field of Classification Search
CPC ........ G06F 21/50; G06F 9/45533; G06F 9/54; G06F 9/45558; G06F 2209/45595; G06F 2221/034; H04L 63/1416; H04L 63/1408
USPC .......................................................... 726/22
See application file for complete search history.

(56) References Cited

U.S. PATENT DOCUMENTS

| | | | | |
|---|---|---|---|---|
| 5,764,897 A | * | 6/1998 | Khalidi | G06F 9/465 707/999.01 |
| 7,389,512 B2 | * | 6/2008 | Tucker | G06F 9/54 719/313 |
| 8,892,876 B1 | | 11/2014 | Huang et al. | |
| 9,268,557 B2 | | 2/2016 | Ben-Haim | |
| 2011/0035586 A1 | * | 2/2011 | Clermont | G06F 21/53 713/164 |
| 2012/0066681 A1 | * | 3/2012 | Levy | G06F 9/5027 718/1 |
| 2013/0091543 A1 | | 4/2013 | Wade et al. | |
| 2013/0263278 A1 | * | 10/2013 | Bauch | G06F 21/6209 726/26 |
| 2014/0059573 A1 | * | 2/2014 | Jawa | G06F 21/53 719/331 |
| 2014/0109107 A1 | * | 4/2014 | Wilkinson | G06F 9/544 719/313 |
| 2014/0137184 A1 | * | 5/2014 | Russello | G06F 21/60 726/1 |
| 2014/0201807 A1 | * | 7/2014 | White | G06F 21/53 726/1 |

(Continued)

OTHER PUBLICATIONS

Programming Interfaces Guide, [online] Oracle ©2011 [Retrieved on May 29, 2015]. Retrieved from the internet<URL: http://docs.oracle.com/cd/E23824_01/html/821-1602/svipc-2.html>.*

(Continued)

*Primary Examiner* — Michael Pyzocha
(74) *Attorney, Agent, or Firm* — Nicholas L. Cadmus; Stephen R. Yoder (57) ABSTRACT

Intercepting inter-process communications by determining a first computer memory location of an inter-process communications function of an instance of a virtual machine and causing an interception function at a second computer memory location to be called when a computer software application calls the inter-process communications function.

3 Claims, 7 Drawing Sheets

(56) References Cited

U.S. PATENT DOCUMENTS

2014/0230012 A1\* 8/2014 Ahn ........................ G06F 21/53
726/1

OTHER PUBLICATIONS

Kuster, Jan-Christoph et al., "Platform-Centric Android Monitoring—Modular and Efficient", arXiv:1406.2041 [cs.SE], Jun. 8, 2014, pp. 1-7.\*
U.S. Appl. No. 14/313,177 entitled "Wrapping Computer Software Applications" filed Jun. 24, 2014.
Appendix P List of IBM Patents or Patent Applications Treated as Related.

\* cited by examiner

```
void* getCurrentJNIFunctionForClass(JNIEnv* env, jclass jclazz,
const char* methodName, const char* descriptor) {
    Method *m = NULL;
    ClassObject* clazz = NULL;

clazz = (ClassObject*) dvmfunc_dvmDecodeIndirectRef(env,
jclazz);

// Good for static or final methods (the method declared as
native in the java side).
    m = dvmfunc_dvmFindDirectMethodByDescriptor(clazz,
methodName, descriptor);

if (!m) {
        // Good for instance methods (the method declared as
native in the java side).
        m = dvmfunc_dvmFindVirtualMethodByDescriptor(clazz,
methodName, descriptor);
    } if (m) {
        return (void*) m->insns;
    } return NULL;
}
```

Fig. 3A

```
jint registerJNIFunction(JNIEnv* env, jobject thiz, const char
  *javaClassName, const char *funcName, const char
  *funcDescriptor, void *newFunc, void **orgFunc) { jint rc = 0, regRc = 0;
  jclass clazz = NULL;
  JNINativeMethod nm;
  nm.name = funcName;
  nm.signature = funcDescriptor;
  nm.fnPtr = newFunc;
  clazz = (*env)->FindClass(env,javaClassName);
  if ((*env)->ExceptionCheck(env)) { // We might not find the
  class and must clear the exception in such cases
        (*env)->ExceptionClear(env);
  } if (clazz) {
     if (orgFunc) *orgFunc = getCurrentJNIFunctionForClass(env,
  clazz, funcName, funcDescriptor); // Return the previous
  function pointer regRc = (*env)->RegisterNatives(env,clazz, (const
  JNINativeMethod*)&nm, 1);
     if (regRc == 0) {
        rc = 1;
     }
     else {
        __android_log_print(ANDROID_LOG_WARN, TAG, "Cannot
  find requested native method");
     }
  }
  else {
     __android_log_print(ANDROID_LOG_WARN, TAG, "Cannot find
  requested class");
  }
  return rc;
} jint rc = registerJNIFunction(
        env,
        ctx,
        "android/os/BinderProxy",
        "transact",
        "(ILandroid/os/Parcel;Landroid/os/Parcel;I)Z",
        (void*)myproject_Binder_transact,
        (void**)&original_Binder_transact);
```

Fig. 3B

```
jboolean myproject_Binder_transact(JNIEnv* env, jobject obj,
      jint code, jobject dataObj, jobject replyObj, jint flags)
{
   jboolean rc = false;

int applyIPCPolicyResult;
   bool allow_transaction = true;
   jvalue jni_rv;

int jni_rc = jni_helpers::call_static_method(
       "com/mycompany/myproject/ipc/BinderHooksManager",
       "applyIPCPolicy", "(Ljava/lang/Object;ILandroid/os/Parcel;Landroid/os/Parcel;I)I"
,
       jni_rv,
       obj, code, dataObj, replyObj, flags);
   if (jni_rc) {
       ENV_E("JNI Error while applying IPC policy: %d", jni_rc);
       allow_transaction = true;
   } else {
     applyIPCPolicyResult = jni_rv.i;//possible values - 0,1,2
   } if (applyIPCPolicyResult==ALLOW_TRANSACT){ //allow
transaction
       rc =
(*original_Binder_transact)(env,obj),code,dataObj,replyObj,flags
); // Call original function
       return rc;
   } else if (applyIPCPolicyResult==BLOCK_TRANSACT_RETURN_TRUE){
//don't call original function, and return true
      return true;
   } else { //don't call original function, and return false
      return false;
   } return true;
}
```

Fig. 3C

```
package com.mycompany.myproject.ipc;

class BinderHooksManager {

. . .

public static int applyIPCPolicy(Object source, int code,
    Parcel data, Parcel reply, int flags) {
        String descriptor = "";
        try {
            descriptor = (String)
    source.getClass().getMethod("getInterfaceDescriptor").invoke(so
    urce);
        } catch (Throwable t) {
            Log.e("MYPROJECT", "Error while intercepting binder IPC
    ", t);
            return ALLOW_TRANSACT_ON_ERROR;
        }

TransactionPolicy policy = policies.get(descriptor);
        if (policy != null) {
            return policy.apply(source, code, data, reply, flags);
        } return ALLOW_TRANSACT;
    }

Fig. 4 ps
INTERCEPTING INTER-PROCESS COMMUNICATIONS

FIELD OF THE INVENTION

The present invention relates generally to computer application security, and more particularly, to intercepting inter-process communications.

BACKGROUND OF THE INVENTION

In computing, inter-process communication (IPC) is a set of methods for the exchange of data among multiple threads in one or more processes. Processes may be running on one or more computers connected by a network. IPC methods are divided into methods for message passing, synchronization, shared memory, and remote procedure calls (RPC).

SUMMARY

In one aspect of the present invention a method is provided for intercepting inter-process communications, the method including determining, by one or more processors, a first computer memory location of an inter-process communications function of an instance of a virtual machine. The method further includes causing, by one or more processors, an interception function at a second computer memory location to be called when a computer software application calls the inter-process communications function.

In other aspects of the invention, systems and computer program products embodying the invention are provided.

BRIEF DESCRIPTION OF THE SEVERAL VIEWS OF THE DRAWINGS

Aspects of the invention will be understood and appreciated more fully from the following detailed description taken in conjunction with the appended drawings in which.

DETAILED DESCRIPTION

Embodiments of the present invention recognize that in order to implement computer-related security mechanisms it is often desirable to intercept inter-process communications between a computer-based application and the operating system or platform components of the computing environment in which the computer-based application is hosted. Embodiments of the present invention also recognize that such interceptions may be used to monitor application activity and implement policies that scrutinize and possibly modify such communications. For example, when an application requests to send data to another application, it may be desirable to check the data for viruses and prevent transmission of the data if they are found to include a virus. Embodiments of the present invention recognize that in some computing environments inter-process communications may be intercepted by hooking operating system calls. However, in other computing environments, such as those that run the Android™ operating system, commercially-available from Google, Inc., Mountain View, Calif., it is not possible to hook operating system calls using conventional techniques.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
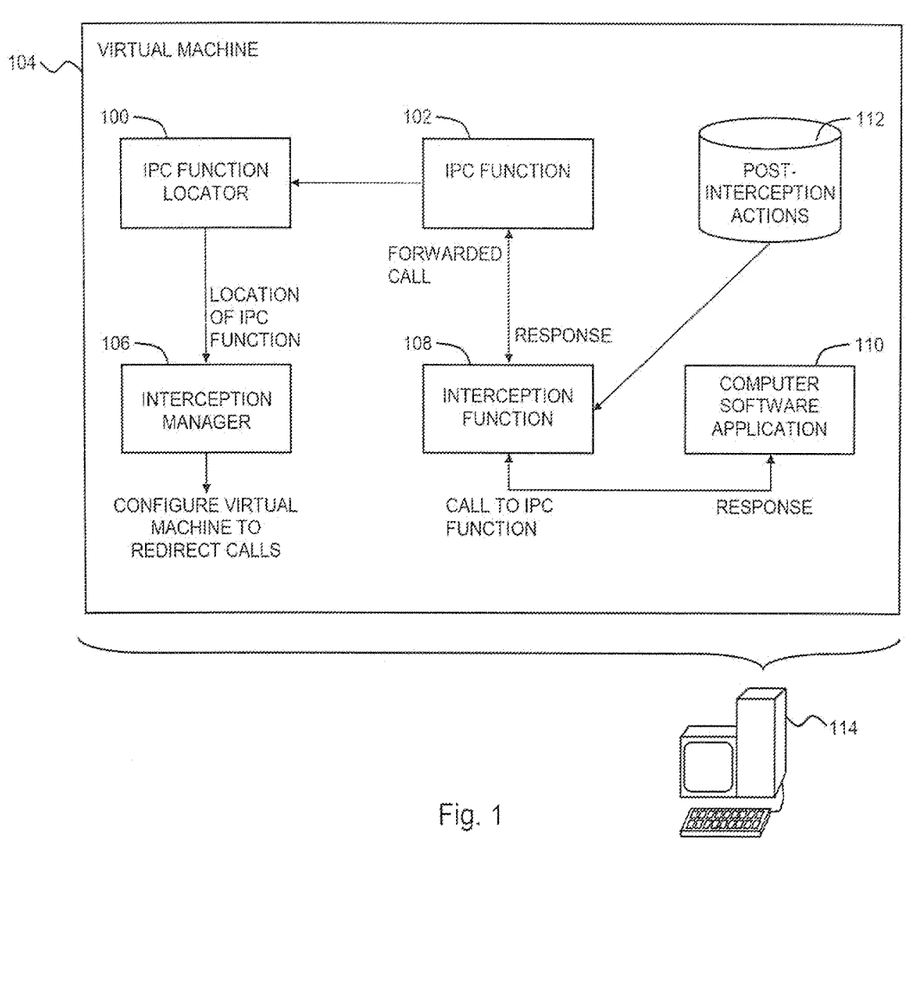
FIG. 1 is a simplified conceptual illustration of a system for intercepting inter-process communications, constructed and operative in accordance with an embodiment of the invention.

Reference is now made to FIG. 1, which is a simplified conceptual illustration of a system for a system for intercepting inter-process communications, constructed and operative in accordance with an embodiment of the invention. In the system of FIG. 1, an inter-process communications (IPC) function locator 100 is configured to determine a location of an inter-process communications function 102 within the computer memory space of a virtual machine 104. An interception manager 106 is configured to cause an interception function 108 at a different location within the computer memory space of virtual machine 104 to be called when a computer software application 110 calls inter-process communications function 102, such as by configuring virtual machine 104 to redirect to interception function 108 any calls to inter-process communications function 102. Interception function 108 is configured to identify one or more predefined post-interception actions 112 that are associated with a call to inter-process communications function 102 and apply the post-interception actions to the call, which may include modifying the call, such as by modifying data received along with the call or otherwise associated with the call, forwarding the modified or unmodified call to inter-process communications function 102 at its computer memory location, or withholding the call from inter-process communications function 102. Where interception function 108 forwards such calls to inter-process communications function 102, interception function 108 preferably forwards to the original caller, such as computer software application 110, any responses to the call that interception function 108 receives from inter-process communications function 102.

Any of the elements shown in FIG. 1 are preferably implemented using a computer, such as a computer 114, by implementing any of the elements of FIG. 1 in computer hardware and/or in computer software.

Figure 2:
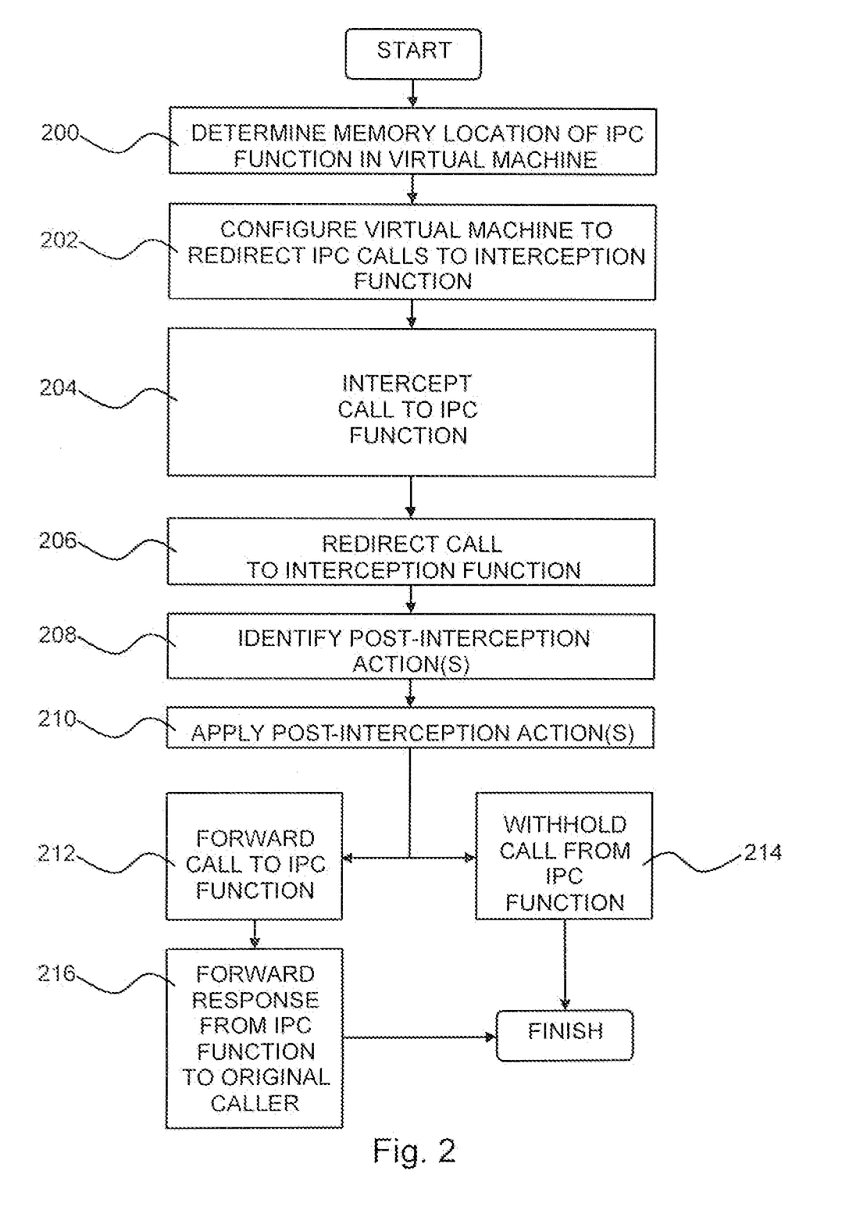
FIG. 2 is a simplified flowchart illustration of an exemplary method of operation of the system of FIG. 1, operative in accordance with an embodiment of the invention.
Figure 3A:
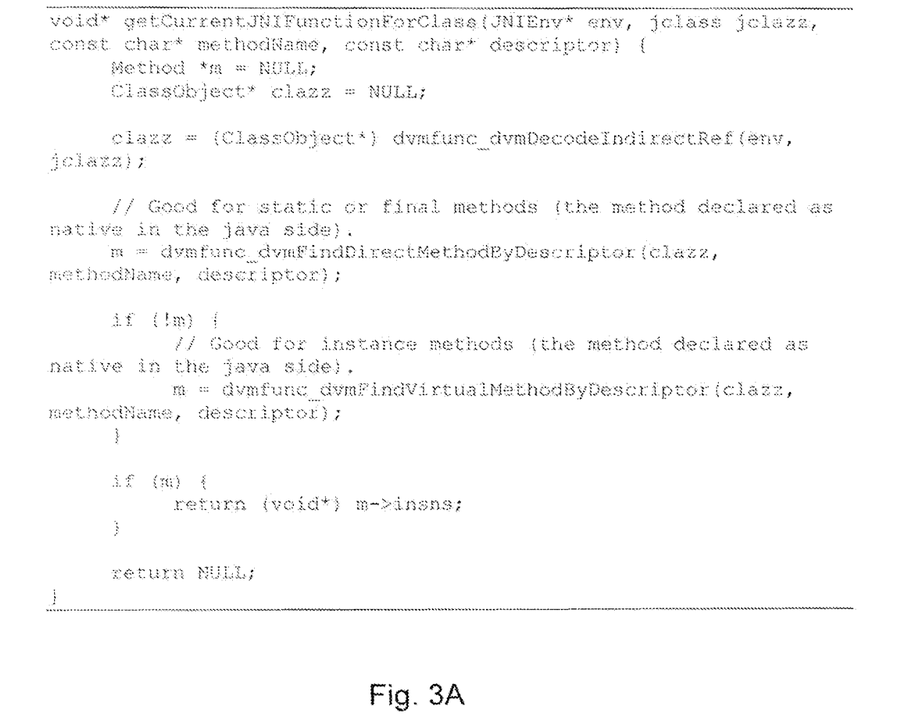
FIGS. 3A-3D are exemplary source code snippets operative in accordance with an embodiment of the invention.
Figure 3B:
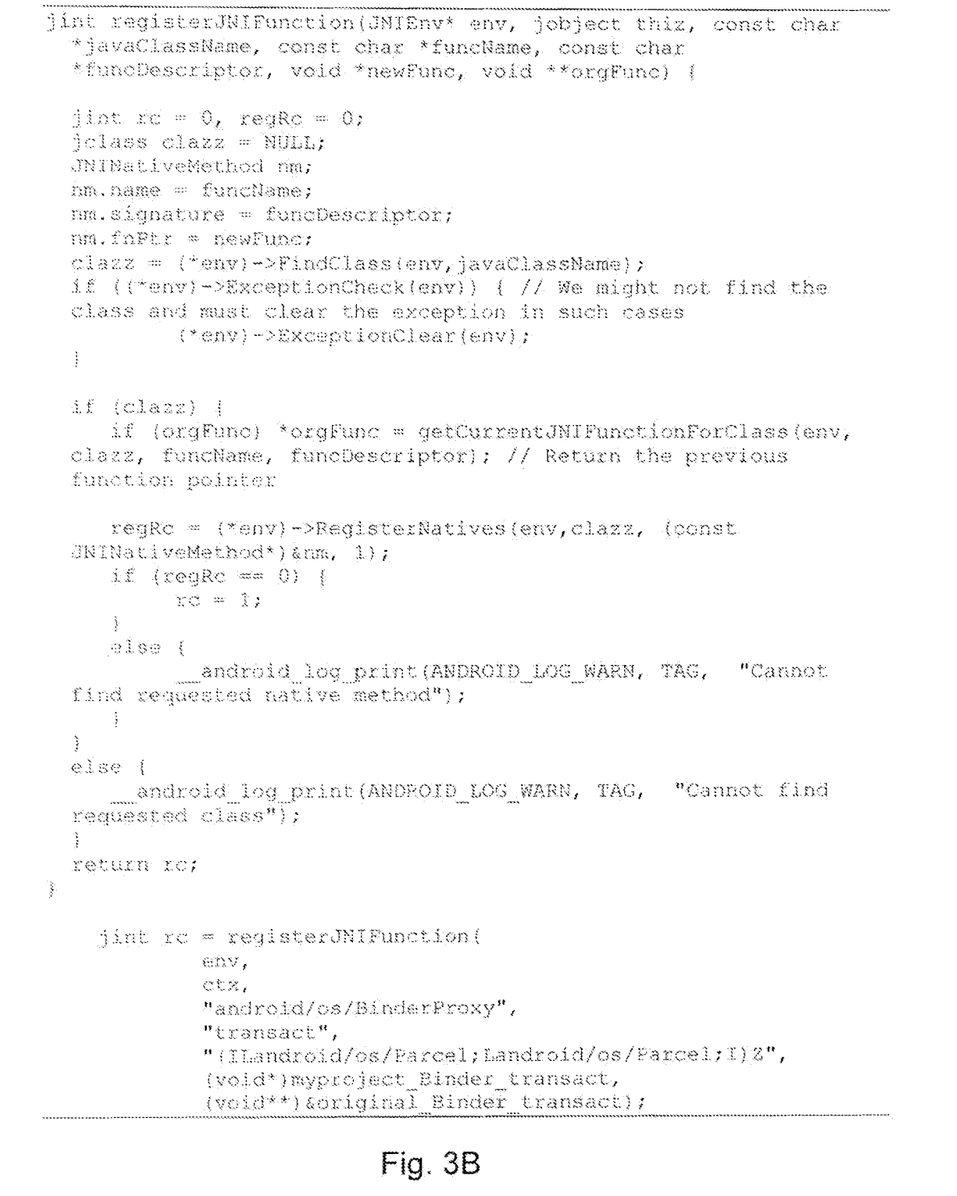
Figure 3C:
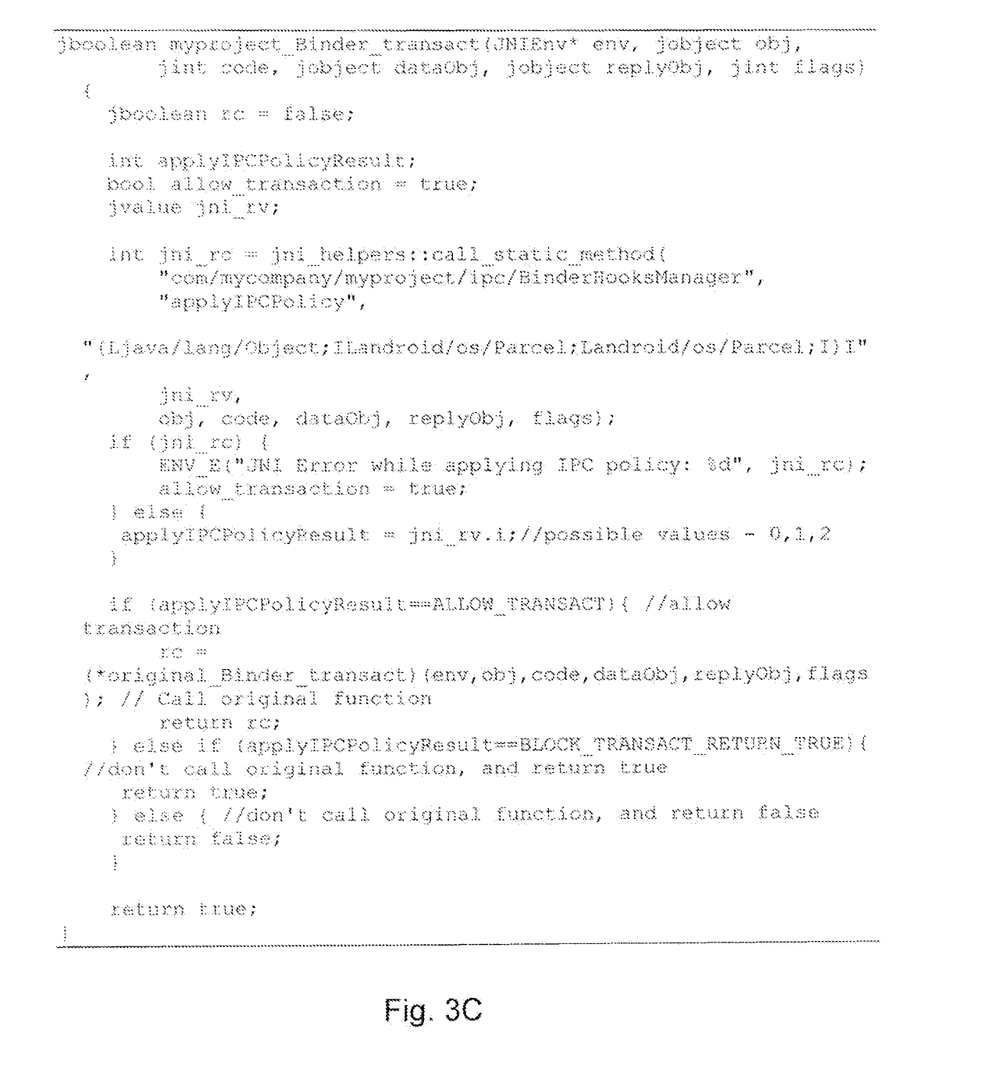
Figure 3D:
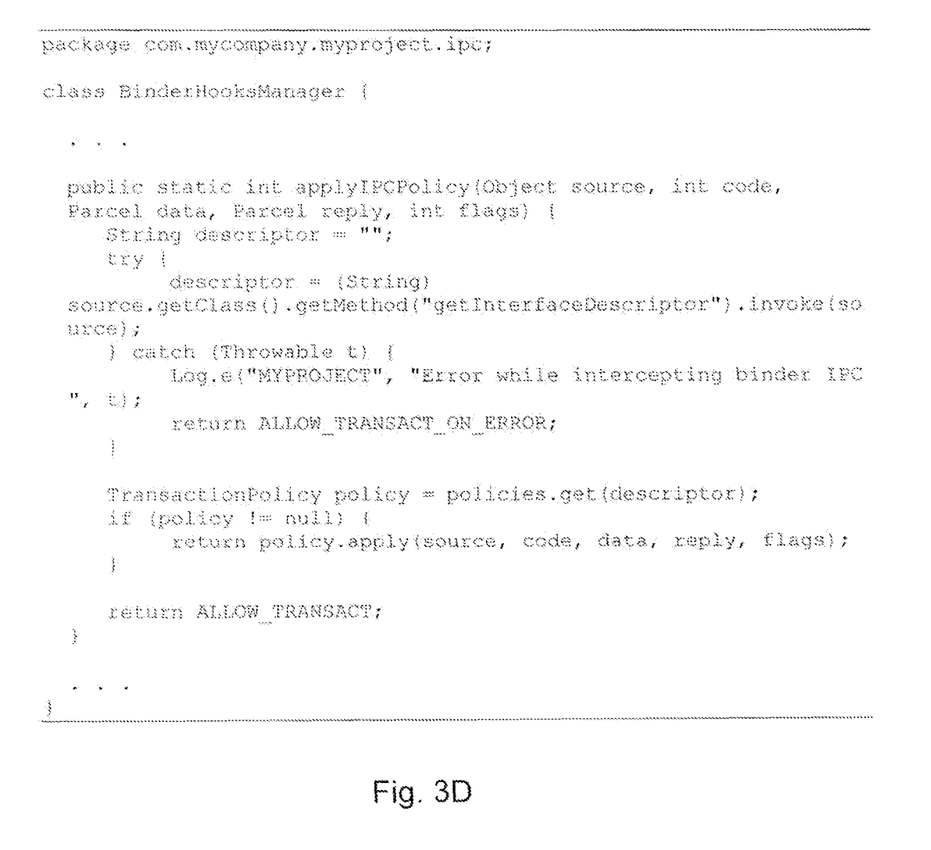

Reference is now made to FIG. 2, which is a simplified flowchart illustration of an exemplary method of operation of the system of FIG. 1, operative in accordance with an embodiment of the invention. In the method of FIG. 2, the location within a computer memory of an inter-process communications function of a virtual machine is determined (step 200). The virtual machine is configured to redirect, to an interception function, any calls to the inter-process communications function (step 202). When a call to the inter-process communications function is intercepted (step 204), the call is redirected to the interception function (step 206), and one or more predefined post-interception actions that are associated with the call are identified (step 208). The identified post-interception actions are applied to the call (step 210), which may include modifying the call, such as by modifying data received along with the call or otherwise associated with the call, forwarding the modified or unmodified call to the inter-process communications function at its computer memory location (step 212), or withholding the call from the inter-process communications function (step 214). Where the interception function forwards such calls to the inter-process communications function, the interception function preferably forwards to the original caller any responses to the call that the interception function receives from the inter-process communications function (step 216).

The system of FIG. 1 and method of FIG. 2 may be illustrated by the following exemplary scenario where the following steps are performed in the context of the Android™ operating system and its Dalvik™ virtual machine.

A computer-based application designed to operate under the Android™ operating system is configured to implement the elements of FIG. 1 and FIG. 2 as described hereinabove, such as by incorporating the source code shown in FIGS. 3A-3D at compile time.

The computer-based application is executed under the Android™ operating system causing the steps below to be performed.

The internal Dalvik™ API dvmFindDirectMethodByDescriptor is called to get the method descriptor for the BinderProxy.transact function of the Binder facility, which handles inter-process communications. Alternatively, dvmFindVirtualMethodByDescriptor is called. An exemplary implementation of this is shown in the code snippet of FIG. 3A.

Either of the calls returns a method structure. According to the Dalvik™ implementation, the structure's insns member points to the currently registered native implementation for the BinderProxy.transact function. This address is saved. An exemplary implementation of this is shown in the code snippet of FIG. 3A as well.

Using a call to the JNI interface's RegisterNatives function, the native implementation of BinderProxy.transact is replaced with an interception function that performs interception logic and invokes the original implementation for BinderProxy.transact as needed. An exemplary implementation of this is shown in the code snippet of FIG. 3B.

Calls to BinderProxy.transact are thus redirected to the interception function where a static method named applyIPCPolicy is invoked, which belongs to the class BinderHooksManager, which is used to record policies for different binder interfaces. The applyIPCPolicy method inspects the binder transaction parameters to infer the interface operated in the transaction, and then passes transaction information to the relevant policy. The policy may modify transaction parameters and then pass the modified transaction to the original BinderProxy.transact function or may prevent the transaction from being completed by withholding the transaction from the original BinderProxy.transact function. An exemplary implementation of this is shown in the code snippets of FIGS. 3C and 3D.

Figure 4:
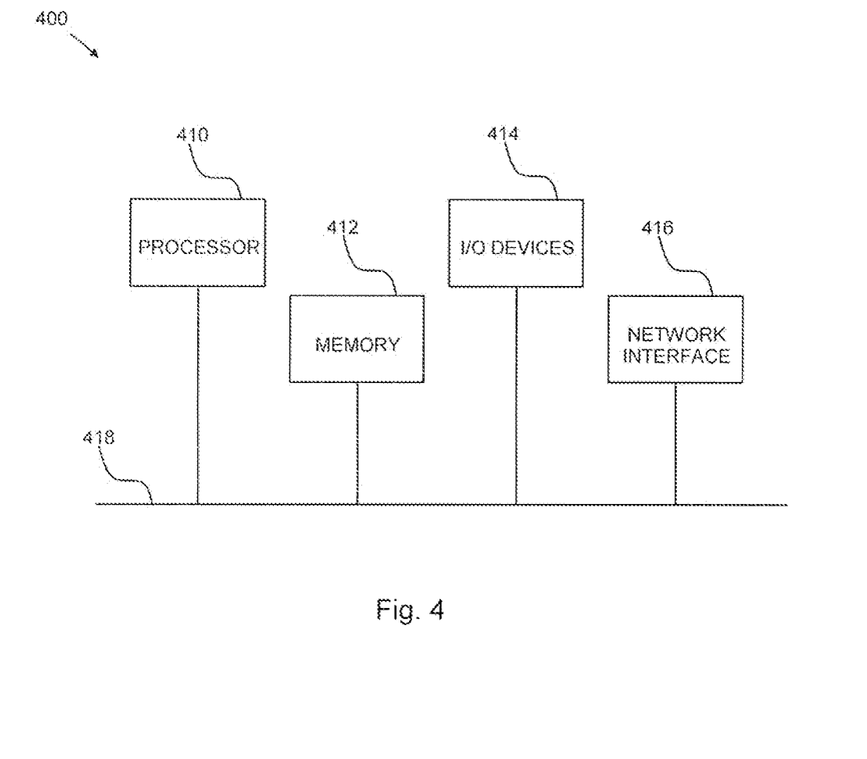
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system, in accordance with which one or more components/methodologies of the invention (e.g., components/methodologies described in the context of FIGS. 1-3D) may be implemented, according to an embodiment of the invention.

As shown, the techniques for controlling access to at least one resource may be implemented, in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying inter-process communications (IPC) in a mobile computing environment, the method comprising:

determining a first computer memory location of an IPC function within an instance of a virtual machine, the IPC function configured to receive IPC calls from an application running on the instance of the virtual machine;

configuring the instance of the virtual machine to redirect, from the IPC function, each IPC call from the application to an interception function located at a second computer memory location within the instance of the virtual machine;

responsive to the interception function receiving an IPC call from the application, identifying, in a post-interception database, a set of post-interception actions corresponding to the IPC call;

selecting a post-interception action from the set of post-interception actions, the post-intercept action including:

invoking a method used to record policies for a set of binder interfaces;

inferring transaction information including an interface operated in a transaction corresponding to the transaction parameters by inspecting a set of binder transaction parameters; and passing the transaction information to the interception function to apply the pre-defined policy;

modifying, according to the post-interception action, transaction parameters to generate a modified IPC call compliant to a pre-defined policy;

sending, by the interception function, the modified IPC call to the IPC function;

receiving, by the interception function, a response from the IPC function; and forwarding, by the interception function, the response to the application.

2. A computer program product for intercepting inter-process communications (IPC), the computer program product comprising:

one or more non-transitory computer readable storage media and program instructions stored on the one or more non-transitory computer readable storage media, the program instructions comprising:

program instructions to determine a first computer memory location of an IPC function within an instance of a virtual machine, the IPC function configured to receive IPC calls from an application running on the instance of the virtual machine;

program instructions to configure the instance of the virtual machine to redirect, from the IPC function, each IPC call from the application to an interception function located at a second computer memory location within the instance of the virtual machine;

program instructions to, responsive to the interception function receiving an IPC call from the application, identify, in a post-interception database, a set of post-interception actions corresponding to the IPC call;

program instructions to select a post-interception action from the set of post-interception actions, the post-intercept action including:
  invoking a method used to record policies for a set of binder interfaces;
  inferring transaction information including an interface operated in a transaction corresponding to the transaction parameters by inspecting a set of binder transaction parameters; and
  passing the transaction information to the interception function to apply the pre-defined policy;

program instructions to modify, according to the post-interception action, transaction parameters to generate a modified IPC call compliant to a pre-defined policy;

program instructions to send, by the interception function, the modified IPC call to the IPC function;

program instructions to receive, by the interception function, a response from the IPC function; and program instructions to forward, by the interception function, the response to the application.

3. A system for intercepting inter-process communications (IPC), the system comprising:

one or more computer hardware processors, one or more non-transitory computer readable storage media, and program instructions stored on the computer readable storage media for execution by at least one of the one or more processors, the program instructions comprising:

program instructions to determine a first computer memory location of an IPC function within an instance of a virtual machine, the IPC function configured to receive IPC calls from an application running on the instance of the virtual machine;

program instructions to configure the instance of the virtual machine to redirect, from the IPC function, each IPC call from the application to an interception function located at a second computer memory location within the instance of the virtual machine;

program instructions to, responsive to the interception function receiving an IPC call from the application, identify, in a post-interception database, a set of post-interception actions corresponding to the IPC call;

program instructions to select a post-interception action from the set of post-interception actions, the post-intercept action including:
  invoking a method used to record policies for a set of binder interfaces;
  inferring transaction information including an interface operated in a transaction corresponding to the transaction parameters by inspecting a set of binder transaction parameters; and
  passing the transaction information to the interception function to apply the pre-defined policy;

program instructions to modify, according to the post-interception action, transaction parameters to generate a modified IPC call compliant to a pre-defined policy;

program instructions to send, by the interception function, the modified IPC call to the IPC function;

program instructions to receive, by the interception function, a response from the IPC function; and program instructions to forward, by the interception function, the response to the application.

* * * * *